(12) United States Patent
Willmer

(10) Patent No.: US 7,374,249 B2
(45) Date of Patent: May 20, 2008

(54) NON-AXISYMMETRICAL WHEEL COVER RETENTION APPARATUSES AND ASSEMBLIES

(75) Inventor: Paul Willmer, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 307 days.

(21) Appl. No.: 11/177,903

(22) Filed: Jul. 8, 2005

(65) Prior Publication Data

US 2007/0007816 A1    Jan. 11, 2007

(51) Int. Cl.
*B60B 7/14*    (2006.01)
(52) U.S. Cl. .......................... 301/37.373; 301/37.102; 301/37.31
(58) Field of Classification Search ........... 301/37.101, 301/37.102, 37.31, 37.34, 37.371, 37.372, 301/37.373
See application file for complete search history.

(56) References Cited

U.S. PATENT DOCUMENTS

| | | | | |
|---|---|---|---|---|
| 4,382,635 A | * | 5/1983 | Brown et al. ............ | 301/37.35 |
| 4,457,560 A | * | 7/1984 | Rowe et al. ............. | 301/37.42 |
| 4,682,820 A | | 7/1987 | Statler | |
| 4,842,339 A | | 6/1989 | Roulinson | |
| 5,071,197 A | * | 12/1991 | Webster et al. ........ | 301/37.372 |
| 5,297,854 A | * | 3/1994 | Nielsen et al. .......... | 301/37.373 |
| 5,520,445 A | | 5/1996 | Toth | |
| 5,842,749 A | | 12/1998 | DiMarco | |
| 5,918,946 A | | 7/1999 | DiMarco | |
| 6,022,081 A | * | 2/2000 | Hauler et al. .......... | 301/37.373 |
| 6,135,570 A | | 10/2000 | Wieczorek | |
| 6,238,007 B1 | * | 5/2001 | Wieczorek et al. ...... | 301/37.31 |
| 6,302,494 B1 | | 10/2001 | DiMarco et al. | |
| 6,325,461 B1 | * | 12/2001 | Hauler ................. | 301/37.372 |
| 6,585,330 B2 | | 7/2003 | Bruce | |
| 6,682,151 B1 | * | 1/2004 | Van Houten et al. ... | 301/37.373 |
| 6,953,226 B2 | * | 10/2005 | Bruce et al. ........... | 301/37.373 |
| 7,108,334 B2 | * | 9/2006 | Bruce .................... | 301/37.373 |
| 2004/0181924 A1 | | 9/2004 | Saunders, II et al. | |
| 2005/0073192 A1 | | 4/2005 | Bruce et al. | |

FOREIGN PATENT DOCUMENTS

EP         1741568        *    1/2007

* cited by examiner

*Primary Examiner*—Russell D. Stormer
(74) *Attorney, Agent, or Firm*—Fredrick Owens; Troutman Sanders LLP; Filip A. Kowalewski

(57) ABSTRACT

The device, a wheel cover assembly, covers at least a portion of a wheel. The wheel cover assembly is secured to the wheel by a lug nut having a flange. The wheel cover assembly has a wheel cover which has an inner surface and an outer surface. The wheel cover assembly also has a plurality of lug wells. Each lug well includes a plurality of extensions extending from the inner surface of the wheel cover to the distal end of the lug well. The extensions have an engagement leg at the distal end of the lug well. Additionally, at least one of the engagement legs is non-axisymmetrical with respect to the remaining engagement legs.

17 Claims, 5 Drawing Sheets

NON-AXISYMMETRICAL WHEEL COVER RETENTION APPARATUSES AND ASSEMBLIES

TECHNICAL FIELD

The present invention relates generally to wheel covers and more particularly to a non-axisymmetrical wheel cover retention.

BACKGROUND

It is well known in the art to provide wheel covers for wheels in a vehicle, such as an automotive vehicle, to enhance the appearance of the wheels. Wheel covers are typically secured to a wheel using conventional devices. For instance, many wheel covers include a plurality of circumferentially spaced openings adapted to receive a lug nut. The lug nut typically has a flange. The spaced openings have extensions that can be snapped to the flange of the lug nut. The extensions are axisymmetrical, or all are stressed or preloaded uniformly, to secure the wheel cover on the wheel.

While the wheel cover may be secured to the flange of lug nuts of the wheel, there are several problems with the conventional designs. First, securing wheel covers to lug nuts using conventional securing devices requires a great deal of effort. Fitting the retention legs over the lug nut is often difficult and requires substantial force. Additionally, removing wheel covers also requires a great deal of force, often resulting in damage to the wheel cover or wheel. Conventional wheel covers can account for tolerance, by providing an excessive interference fit with the lug nut.

Essentially, existing snap-on, secured wheel covers retained by lug nuts with features molded into the wheel cover are over-designed with heavy sections and high preload settings or interference fit. Conventional designs attempt to compensate for lug nuts and wheel cover assembly tolerance stack-ups. The heavy sections and high preloads result in excessive installations and removal efforts which are significant design shortfalls.

An additional problem with existing wheel covers includes creep. Creep is the time-dependent part of permanent strain, or plastic deformation, resulting from stress. Typically, creep occurs when a plastic part is subjected to a load for a long period of time. Creep degrades retention performance and can create looseness of the secured wheel cover over time. This is especially problematic at higher temperatures. Obviously, with the preloaded fit of the wheel cover over the flange of the lug nut, once the wheel cover begins to creep the wheel cover nominal preload is reduced degrading retention performance and the wheel cover can become loose. This results is an insecure wheel cover, which can rattle during driving or become detached.

Indeed, existing designs account for "loose fit" tolerance stack-up by increasing nominal interference fit (i.e. preload) on all engagement or retention legs. This substantially degrades post durability retention performance (i.e. creep test, peak temperature test, etc.) and results in exceedingly high installation and removal efforts. The various embodiments of the present invention can account for root sum of squares "loose fit" tolerance stackup between the wheel cover and lug nut features (i.e. the wheel cover fit is tight with two or more −3 sigma "loose fit" wheel nuts) without the need for nominal interference fit on the majority of retention engagement legs.

Thus, there is a need in the art for an improved wheel cover enabling easier installation and removal. Further, there is a need for an improved wheel cover that improves resistance to creep. There is also a need for an improved wheel cover providing a snug fit of the wheel cover to the wheel for all wheel nut sizes and position manufacturing variations.

SUMMARY

The embodiments of the present invention provide a wheel cover device having a non-axisymmetrical characteristic. Generally described, the device is a wheel cover assembly designed to make installation and removal of wheel covers easier, and to improve the life of wheel covers attached to the wheel, thus preventing loss of wheel covers.

The wheel cover assembly may cover at least a portion of a wheel. The wheel cover assembly is secured to the wheel by a lug nut having a flange. The wheel cover assembly has a cover having an inner surface. The wheel cover assembly can also have a plurality of lug wells. Each lug well can include a plurality of extensions extending from the inner surface of the wheel cover to a distal end of the lug well. The extensions can have an engagement leg at the distal end of the lug well. Additionally, at least one of the engagement legs can be non-axisymmetrical with respect to the remaining engagement legs.

The wheel cover assembly, further, can have each engagement leg having an angled portion having a first angle. The first angle is adapted to releasably engage a flange of the lug nut. The wheel cover can also have at least one non-axisymmetrical engagement leg having an angled portion at a second angle, different from the first angle. In this arrangement, the wheel cover assembly can be secured to the wheel.

The wheel cover assembly, additionally, can have the engagement leg adapted to connect or snap on, or connect to the flange of the lug nut. This arrangement secures the wheel cover assembly to the wheel.

The wheel cover assembly may also have at least one engagement leg that is preloaded. The preloaded or stressed engagement is held in tension to secure the wheel cover assembly to the wheel.

The wheel cover assembly can also have the plurality of extensions creating an opening of the lug wall. These openings can receive the lug nut to allow the wheel cover to secure to the lug nut.

The wheel cover assembly may also have between two and ten extensions per lug well. In an exemplary embodiment, there are five extensions per lug well.

The present invention may also include a wheel assembly. The wheel assembly includes a plurality of lug nuts that have a flange and a central axis. The wheel assembly also includes a wheel cover, which covers a portion of a wheel. The wheel assembly further includes a plurality of elongated extensions extending axially from the wheel cover. The elongated extensions assist in attaching the wheel cover to the lug nuts of wheel. Each elongated extension include at least one engagement leg. The engagement legs are adapted to engage the flange of the respective lug nut. At least one engagement leg has a non-axisymmetrical characteristic with respect to the remaining engagement legs.

The non-axisymmetrical characteristic of the engagement leg can be any profile difference that results in preload, or tension, in the nominal tolerance condition. The non-axisymmetrical characteristic of the engagement leg can be an angle, from the tapered portion to the center line of the lug well, that is different from the axisymmetrical engagement of the remaining engagement legs. The non-axisymmetrical characteristic can have an offset, from the shoulder of the extension to the tapered portion of the engagement leg, that is different from the axisymmetrical engagements of the remaining engagement legs. The non-axisymmetrical characteristic can have an engagement leg different from the radius of the axisymmetrical engagement legs.

The various aspects of the embodiments of the present invention may be more clearly understood and appreciated from a review of the following detailed description of the disclosed embodiments and by reference to the appended drawings and claims.

DETAILED DESCRIPTION OF THE DRAWINGS

Figure 1:
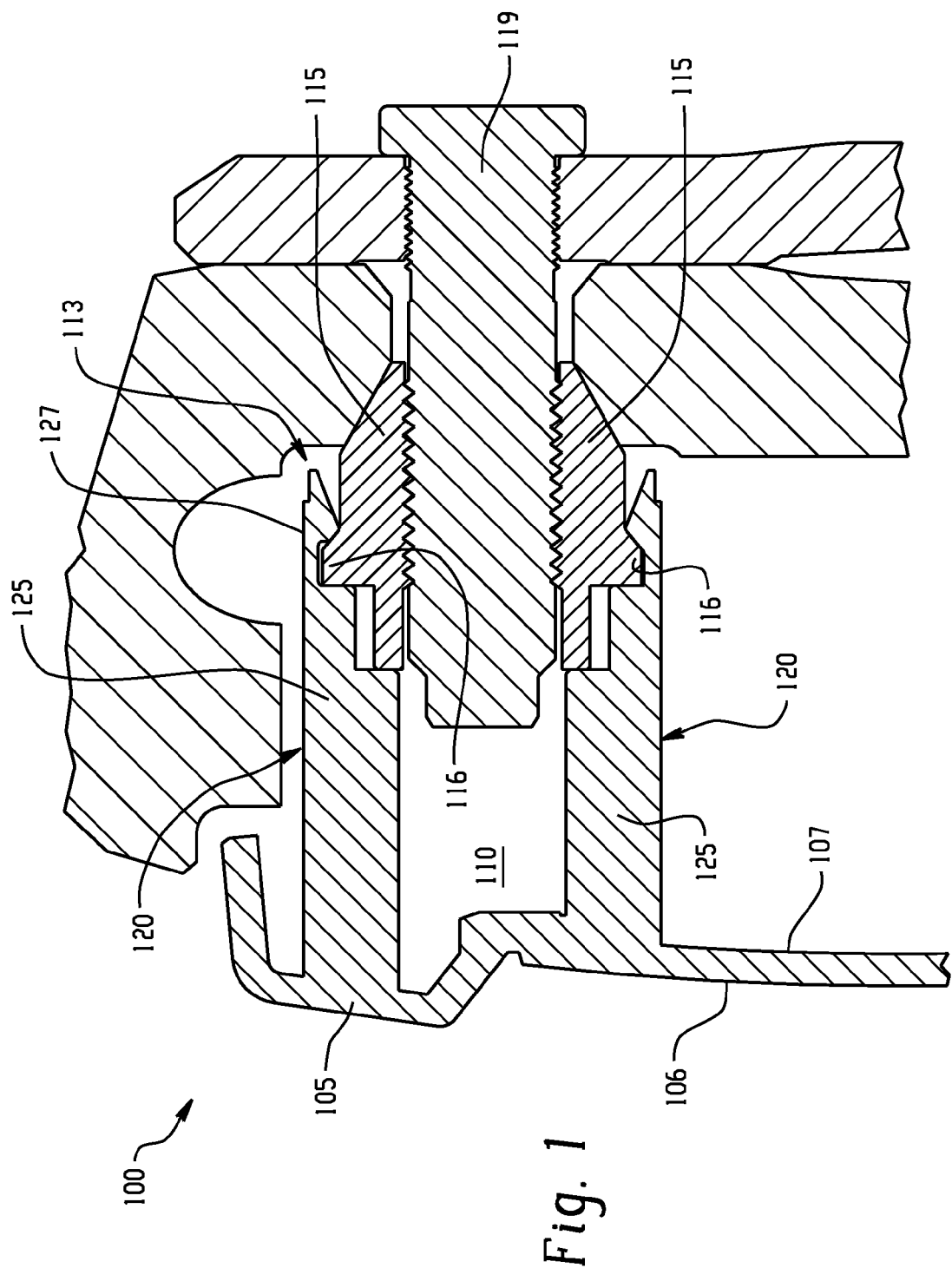
FIG. 1 illustrates a cross-sectional view of a wheel cover assembly in accordance with some embodiments of the present invention.

Referring now to the above figures, wherein like reference numerals represent like parts throughout the several views. FIG. 1 depicts a cross-sectional view of the wheel cover assembly according to an embodiment of the present invention. The wheel cover assembly 100 covers at least a portion of a wheel (not shown). The wheel cover assembly 100 includes a wheel cover 105 and an extension 120 for engaging a lug nut 115 and rigidly affixing the wheel cover assembly 100 to the wheel. The wheel cover 105 can have an outer surface 106 and an inner surface 107. The outer surface 106 typically has a decorative design and/or a decorative finish.

The wheel cover assembly 100 has at least one opening, or a lug well 110, which extends from the inner surface 107 of the wheel cover 105. The lug well 110 is defined by a plurality of extensions 120. In fact, there can be a plurality of lug wells 110 associated with the wheel cover 105. In an exemplary embodiment of the present invention, the wheel cover assembly 100 contains five lug wells 110 per wheel. Consequently, each lug well 110 engages a lug nut 115 of the wheel.

Each lug well 110 is formed by a plurality of extensions 120 extending from the inner surface 107 of the wheel cover 105 to a distal end 113 of the lug well 110. In an exemplary embodiment of the invention, each lug well 110 contains between two and ten extensions spaced around the circumference of the lug well 110. In an exemplary embodiment there are five extensions 120 associated with each lug well 110. In another exemplary embodiment, there are six extensions 120 associated with each lug well 110. The extensions 120 snap to the flange 116 of the lug nut 115, thus securing the wheel cover assembly 100 to the wheel.

Each extension 120 has a body portion 125 and an engagement leg or nubbin 127. The engagement leg 127 is located at the distal end 113 of the extension 120.

Only one of the engagement legs 127 is non-axisymmetrical with respect to the remaining engagement legs. In an exemplary embodiment of the present invention, at least one of the engagement legs 127 is non-axisymmetrical with respect to the remaining engagement legs of each lug well 110. The non-axisymmetrical engagement leg is a preloaded, or stressed, when engaged with the lug nut 115 to secure the wheel cover 105 to the wheel. The remaining engagement legs of each lug well 110 are in non-stressed, or in-line condition. The non-axisymmetrical design of one of the engagement legs 127 provides several advantages over conventional designs. First, the amount of creep is reducted. Since only one of the engagement legs 127 is preloaded, only the preloaded engagement leg may experience creep. The in-line engagement legs typically experience little to no creep. Therefore, the engagement legs 127 are able to hold the shape longer and securely engage the lug nut 115. Secondly, the installation and removal of the wheel cover 105 is eased compared to conventional designs.

Figure 2:
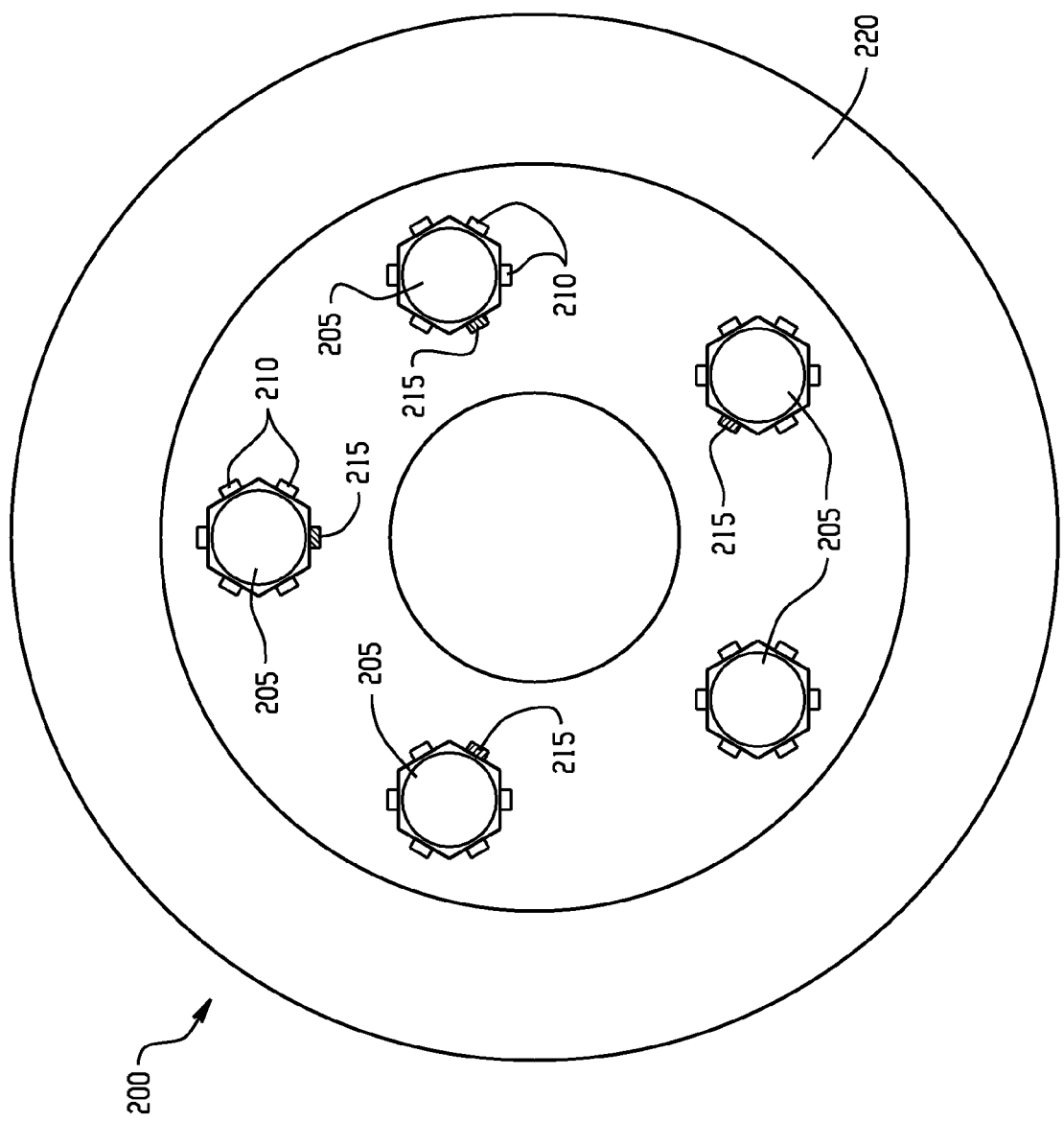
FIG. 2 illustrates a perspective view of the location of a set of retention legs on a set of lug nuts in accordance with some embodiments of the present invention.

FIG. 2 depicts a lug nut system 200 in a typical vehicular environment. In a typical vehicle wheel 220, for instance an automobile wheel, there are a total of five (5) lug nuts 205. The lug nuts 205 secure the wheel 220 to a wheel hub.

The conventional lug nut 205 includes an internal threaded portion, a flange or locking mechanism, and an external tool receiving end. Typically, at least a portion of the external tool receiving end has a hexagon body shape, which makes it easier to install and remove the lug nut 205 from the wheel. The lug nuts 205 penetrate holes in the wheel 220 and attach to lug bolts (not shown). Those skilled in the art will recognize that the lug nuts 205 can have any body shape and either contain or not include a lug stud.

Each wheel cover can have a plurality of extensions extending from a wheel cover to snap around the flange of the lug nut 205. In an exemplary embodiment, there are five extensions to snap to each lug nut 205. Of the plurality of wheel cover extensions at least three of them, preferably, are preloaded. The extensions 210 are indicated, as are the preloaded extensions 215. The preloaded extensions 215 include the extensions that are held under stress or tension; they are non-axisymmetrical with the remaining extensions 210. The preloaded extensions 215 do not take the shape that they had prior to installation. Further, the preloaded extensions 215 are deflected after installation. Essentially, after installation, the preloaded extensions 215 does not snap back to its free state.

In another exemplary embodiment, a vehicle may have 5 lug nuts 205 per wheel 220, and 6 extensions 120 per lug nut for a total of 30 extensions 120 per wheel 220. Thus, there are a total of 4 preloaded, or non-axisymmetrical, extensions 215, and 26 non-preloaded extensions 210 that have symmetrical, or non-preloaded, characteristics. As a result, 4 extensions 215 will have the same preload, while the remaining 26 extensions 210 will have the same shape and be non-loaded or in-line when engaging the lug nut 115. Preferably, preloaded extensions 205 do not co-exist on the same lug nut 205 and do not produce tension in adjacent extensions.

Figure 3:
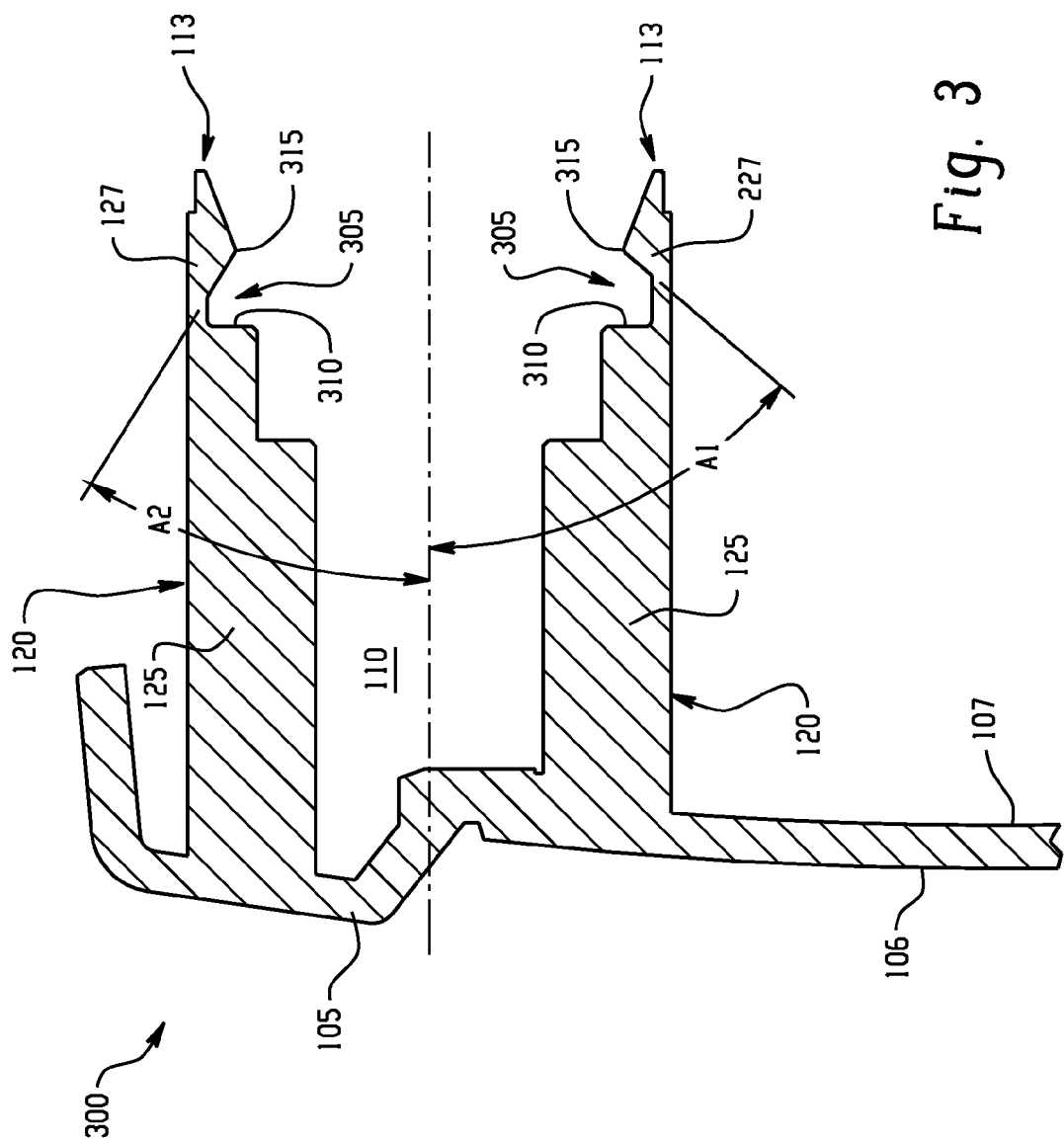
FIG. 3 illustrates another cross-sectional view of a wheel cover assembly in accordance with some embodiments of the present invention.

FIG. 3 illustrates a cross-sectional view of an exemplary embodiment of a wheel cover assembly 300. The engagement leg 127 contains an undercut groove 305, which includes a shoulder 310. The shoulder 310 is located at the junction between the end of the body portion 125 and the engagement leg 127. The engagement leg 127 also contains a tapered portion 315 located at an opposite end of the groove 305. When the wheel cover 105 is attached to the wheel, the elongated extensions 120 are aligned with the lug nuts 115 and the wheel cover 105 is moved axially inward toward the wheel, so that the engagement leg 127 separates slightly and pass over the lug nut 115 and the flange 116 until the undercut groove 305 is allowed to snap over the flange 116 of the lug nut 115. Concurrently, the shoulder 310 of the undercut groove 305 will abut against the upper shoulder of the flange 116 of the lug nut 115, thereby providing a positive axial location of the wheel cover 105 to the wheel and eliminating the effects of tolerance stack ups of any other surfaces.

The tapered portion 315 passes over the flange 116 of the lug nut 115 and engages the underside of the flange 116, thereby creating a retention force sufficient to retain the wheel cover 105 on the lug nut.

The engagement leg 127 can be designed to be non-axisymmetrical in relation to other extension legs. For example, one engagement leg 227 can be non-axisymmetrical with the remaining engagement legs 127. In an exemplary embodiment of the present invention, the tapered portion 315 of the non-axisymmetrical engagement leg 227 may have a predetermined angle A2 in relation to the center axis of the lug nut 115. As shown in FIG. 3, the angle A2 of the tapered portion 315 of the non-axisymmetrical engagement leg 227 is offset by approximately 30 degrees from the center axis of the lug well 110. The remaining engagement legs 127 snapped to the lug nut 115 are offset at and angle A1 of approximately 60 degrees from the center axis of the lug nut 115, in this embodiment. As a result, the approximately 30 degree angle offset is the non-axisymmetrical engagement leg 227. As one skilled in the art would recognize, the angles chosen should be different (thus, non-axisymmetrical) and should be in the range of 10 degrees to 80 degrees to allow the engagement leg 127 to secure the extension 120 to the flange 116 of the lug nut 115.

Figure 4:
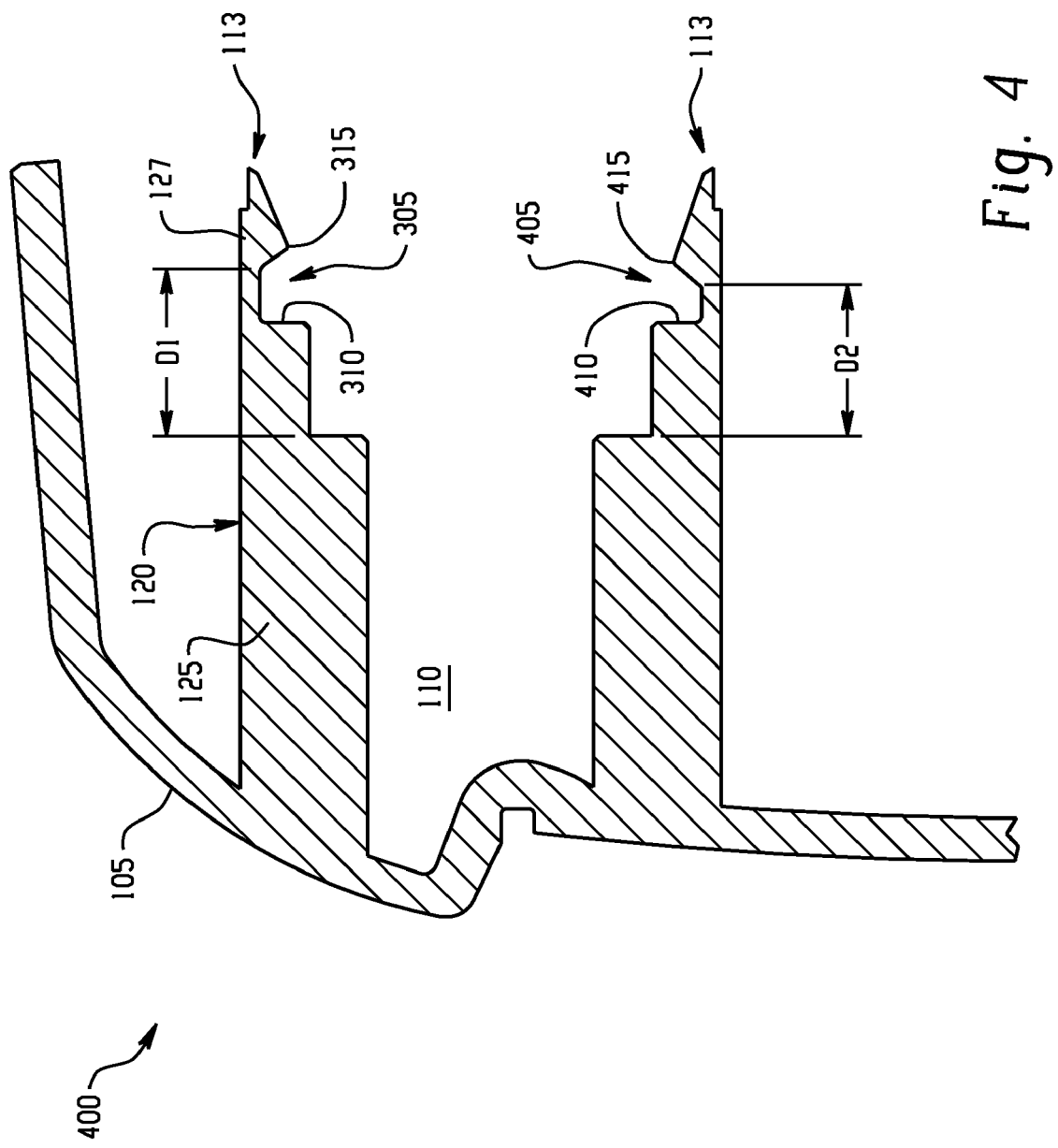
FIG. 4 depicts a cross-sectional view of a wheel cover assembly in accordance with an exemplary embodiment of the present invention.
Figure 5:
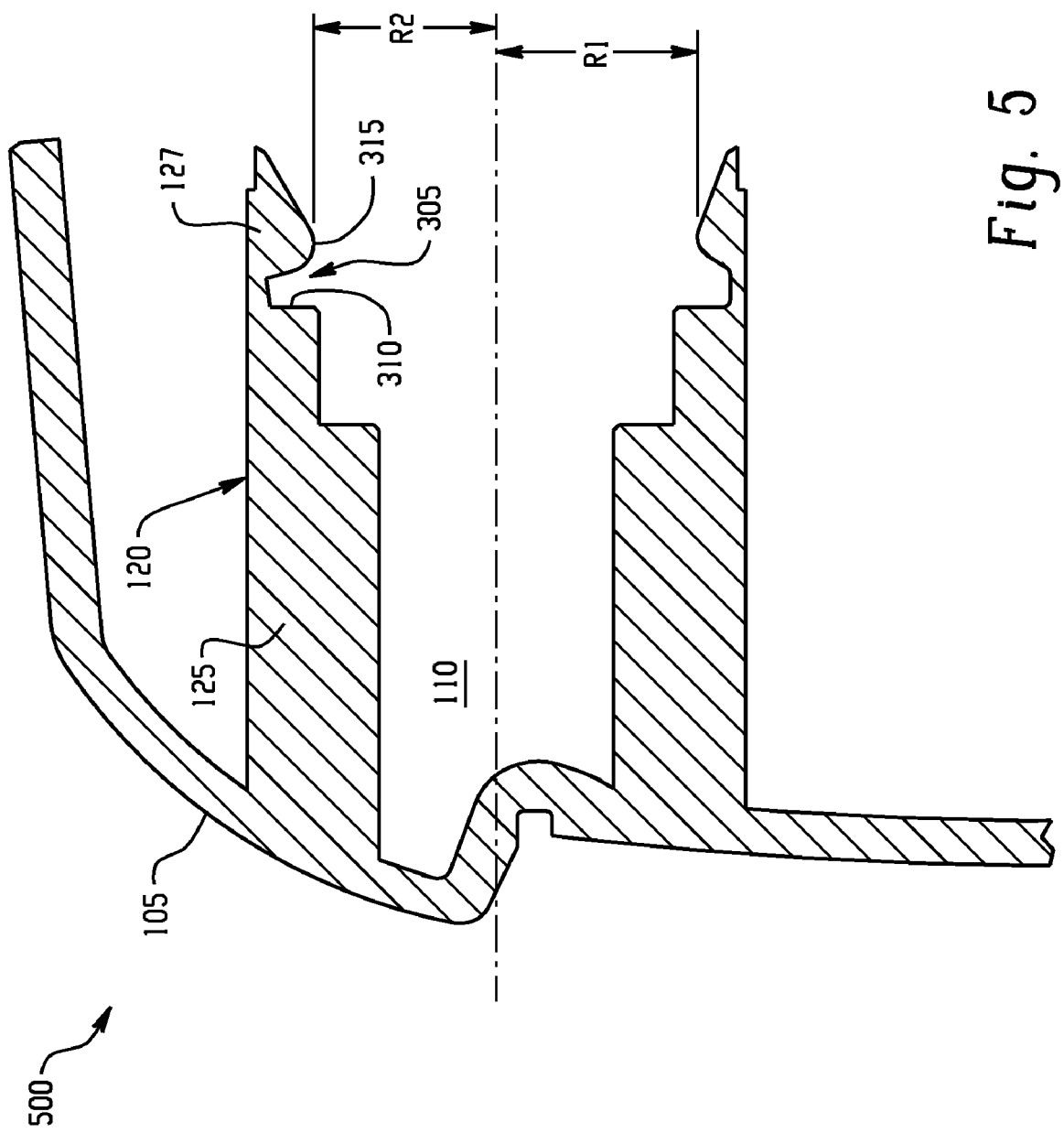
FIG. 5 illustrates a cross-sectional view of a wheel cover assembly in accordance with yet another exemplary embodiment of the present invention.

FIG. 4 illustrates a cross-sectional view of an exemplary embodiment of a wheel cover assembly 400. In FIG. 4, the grooves 305 and 405 are preloaded to a different offset, D1 and D2, respectively. The offset is set by the actual size of the groove 305, or the distance from the shoulder 310 to the tapered portion 315 versus the offset of the groove 405, or the distance from the shoulder 410 to the tapered portion 415. The size of the groove 405 is set to the size of the flange 116 of the lug nut 115. Thus, the groove 405 engages and snaps to the flange 116 to secure the wheel cover assembly 400 to the wheel. The preloaded offset creates the non-axisymmetrical characteristic of the wheel cover 105. For instance, in an exemplary embodiment of the present invention, the preloaded offset, D1, is approximately 13.93 mm, while the remaining offset, D2, is approximately 14.5 mm. One skilled in the art will recognize that the offset should be in the range of approximately 0.5 mm to approximately 1.0 mm FIG. 5 illustrates a cross-sectional view of an exemplary embodiment of a wheel cover assembly 500. The engagement leg 127 can be designed to be non-axisymmetrical in relation to other extension legs. As described, one engagement leg 127 can be non-axisymmetrical with the remaining engagement legs 127. In an exemplary embodiment, the radii of the tapered portion 315 of the engagement leg 127 are the non-axisymmetrical characteristic. The radii of the tapered portion 315 can be preloaded to create a different radius than the remaining non-preloaded tapered portions. In an exemplary embodiment of the present invention, the tapered portion 315 of the non-axisymmetrical engagement leg 127 can have a predetermined radius R1 different from a radius R2. The result is a non-axisymmetrical characteristic of the wheel cover 105. As shown in FIG. 5, the radius of the non-axisymmetrical engagement leg 127 is set to R2. The remaining engagement legs 127 snapped to the lug nut 115 are set to R1 a different sized radius. As a result, the different radii establish a non-axisymmetrical characteristic. As one skilled in the art would recognize, the radii chosen should be difference should be in the range of approximately 0.5 mm to approximately 1.0 mm.

The various embodiments of the present invention have been described with reference to the above discussed embodiments, but the present invention should not be construed to cover only these embodiments. Rather, these embodiments are only exemplary embodiments. Variations of the above exemplary embodiments may suggest themselves to those skilled in the art or others without departing from the spirit and scope of the present invention. The appended claims and their full range of equivalents should, therefore, only define the full scope of the present invention.

What is claimed is:

1. A wheel cover assembly comprising:
   a cover having an inner surface;
   a plurality of lug wells comprising a plurality of extensions extending from the inner surface of the cover to a distal end, each of the extensions having an engagement leg at the distal end; and
   wherein only one engagement leg in a lug well is non-axisymmetrical with respect to the remaining engagement legs in the lug well.

2. The wheel cover assembly of claim 1, wherein each engagement leg has an angled portion having a first angle to releasably engage a flange of a lug nut and each non-axisymmetrical engagement leg has an angled portion having second angle.

3. The wheel cover assembly of claim 1, wherein each engagement leg is further adapted to connect with a flange of a lug nut.

4. The wheel cover assembly of claim 1, wherein each non-axisymmetrical engagement leg is pre-loaded having a tension to secure the wheel cover assembly to the wheel.

5. The wheel cover assembly of claim 1, wherein the plurality of extensions create an opening to receive the lug nut.

6. The wheel cover assembly of claim 1, wherein there are between two and ten extensions per lug well.

7. The wheel cover assembly of claim 1, wherein there are five extensions per lug well.

8. The wheel cover assembly of claim 1, wherein there are six extensions per lug well.

9. A wheel assembly comprising:
   a plurality of lug nuts having a flange and a central axis;
   a wheel cover adapted to cover a portion of a wheel; and
   a plurality of elongated extensions extending from the wheel cover to attach the wheel cover to the lug nuts, each elongated extension including an engagement leg adapted to engage the flange of a lug nut to secure the wheel cover to the wheel,
   wherein only one engagement leg is non-axisymmetrical with respect to the remaining engagement legs engaging the same lug nut.

10. The wheel assembly of claim 9, wherein the non-axisymmetrical engagement leg has an angle non-axisymmetrical with an angle of the remaining engagement legs.

11. The wheel assembly of claim 9, wherein the non-axisymmetrical engagement leg has an offset non-axisymmetrical with an offset of the remaining engagement legs.

12. The wheel assembly of claim 9, wherein the non-axisymmetrical engagement leg has a radius non-axisymmetrical with a radius of the remaining engagement legs.

13. A wheel cover assembly comprising:

a wheel cover adapted to cover a portion of a wheel;

a plurality of lug nuts including a flange and having a central axis;

a plurality of axisymmetrical extensions extending axially from the wheel cover to a distal end, each having an axisymmetrical engagement leg; and at least one non-axisymmetrical extension extending axially from the wheel cover to the distal end and having an non-axisymmetrical engagement leg, each of the non-axisymmetrical engagement legs securing to a different lug nut, wherein the non-axisymmetrical engagement leg is adapted to secure to the flange of the lug nut with a preloaded characteristic, and wherein all the engagement legs have a groove defined from a shoulder to a tapered portion.

14. The wheel cover assembly of claim 13, wherein the axisymmetrical engagement legs have an angle from the tapered portion of the groove to the central axis of the lug nut different from the non-axisymmetrical engagement leg from the tapered portion of the groove to the central axis of the lug nut.

15. The wheel cover of claim 14, wherein the axisymmetrical engagement legs angle is approximately 30 degrees and wherein the non-axisymmetrical engagement leg angle is approximately 60 degrees.

16. The wheel cover assembly of claim 13, wherein the axisymmetrical engagement legs have an offset groove different from the non-axisymmetrical engagement leg groove.

17. The wheel cover assembly of claim 13, wherein all the engagement legs have a radius and wherein the radius of the axisymmetrical legs differ from the radius of the non-axisymmetrical leg.

* * * * *